United States Patent [19]

Nakazoe

[11] Patent Number: 5,148,042
[45] Date of Patent: Sep. 15, 1992

[54] SMALL ELECTRONIC DEVICE CAPABLE OF SWITCHING BATTERIES BY RELEASING A BATTERY LOCKING MECHANISM

[75] Inventor: Masayo Nakazoe, Tokyo, Japan

[73] Assignee: Kabushiki Kaisha Toshiba, Kawasaki, Japan

[21] Appl. No.: 578,235

[22] Filed: Sep. 6, 1990

[30] Foreign Application Priority Data

Dec. 29, 1989 [JP] Japan .................. 1-343064

[51] Int. Cl.⁵ .............................................. H02J 9/06
[52] U.S. Cl. ...................................... 307/65; 307/66; 307/86; 307/150
[58] Field of Search ............... 364/707, 708; 371/66; 365/229; 320/2, 5, 6; 429/9, 96–100; 307/46, 48, 64, 65, 66, 85–87, 150

[56] References Cited

U.S. PATENT DOCUMENTS

| | | | |
|---|---|---|---|
| 3,767,933 | 10/1973 | Bogue et al. | 307/48 |
| 3,937,937 | 2/1976 | McVey | 371/66 |
| 4,155,015 | 5/1979 | Nakasone et al. | 307/157 X |
| 4,214,172 | 7/1980 | See | 307/150 |
| 4,816,862 | 3/1989 | Taniguchi et al. | 365/229 X |
| 4,965,462 | 10/1990 | Crawford | 320/2 |
| 5,028,806 | 7/1991 | Stewart et al. | 307/66 |

FOREIGN PATENT DOCUMENTS

59-52328   3/1984   Japan .................. 364/708

*Primary Examiner*—A. D. Pellinen
*Assistant Examiner*—Fritz M. Fleming
*Attorney, Agent, or Firm*—Finnegan, Henderson, Farabow, Garrett and Dunner

[57] ABSTRACT

A small electronic device includes first and second locking devices which releasably lock the batteries on a first and second mounting portions, first and second detectors which respectively detect that the locked conditions of first and second locking devices have been released, first and second switches for connecting the first and second batteries to a power supply node. The electronic device also includes a control unit which turns on the first switch to connect the first battery to the power supply node, and switches from an off state to an on state the second switch in response to a detection signal from the first detector.

19 Claims, 7 Drawing Sheets

SMALL ELECTRONIC DEVICE CAPABLE OF SWITCHING BATTERIES BY RELEASING A BATTERY LOCKING MECHANISM

BACKGROUND OF THE INVENTION

1. Field of the Invention

The present invention relates to a small electronic device such as a personal computer or a word processor, and more particularly to a small electronic device which has a plurality of removable batteries.

2. Description of the Related Art

Recent years have seen the development of a variety of so-called lap top computers, which are basically portable personal computers.

Some typical models of lap top personal computers are provided with a foldable flat type display, such as a plasma display, which is freely rotatable between a closed position and an open position with respect to the main body of the computer. The plasma display can be folded down onto the main body to a closed position, such that it covers the keyboard which is integral with the main body of the computer. This feature, together with its relatively light weight and compact dimensions, makes the device easy to carry around from place to place.

To further improve their portability, some recently-developed lap top computers employ a battery such that they can be used even if the commercial power source is not available. In a case where the capacity of the battery is low, the operator is required to remove the battery from the main body of the computer and to charge or replace it. Because the lap top personal computer cannot be operated unless a commercial power source is used while the battery is being charged or replaced, places where the lap top computer can be used will be limited to places where commercial power can be made available.

With this in mind, lap top personal computers equipped with two batteries have been developed to improve the portability thereof. In a lap top computer of this type, it is possible to operate the lap top computer by using one of the two batteries as its power source even if the capacity of the other battery is low and that battery is removed from the computer for charging or replacement. The switching from one battery to the other battery to be used as a power source for the computer, that is, the switching from the battery in use as a power source to the battery not in use, is carried out automatically when the battery being used is removed from the main body of the computer. That is to say, the lap top personal computer detects, by means such as a microswitch, that the battery being used as a power source has been removed from the main body of the computer and switches the battery to be used as a power source from the removed battery to the other battery.

However, in switching these batteries, if the timing to switch from one battery to the other should be delayed by even a fraction of a second when the battery in use is removed from the main body of the computer, malfunctions or erasure of various data of the lap top personal computer will result due to the power supply to the lap top personal computer being discontinued for a short time if the timing to switch to the other battery is delayed.

For this reason, in a lap top personal computer provided with two batteries, when the battery in use is to be removed from the main body of the computer for charging or replacement thereof, so as to prevent conditions such as the erased data from occurring even when the power supply is stopped, it is necessary for the operator to accomplish troublesome operations such as storing the necessary data in such means as a magnetic disc unit before he or she removes the battery from the computer.

On the other hand, in order to prevent the power supply to the lap top computer from being interrupted, a method has been designed in which a power source is always supplied to the computer not only from the battery being used as a power source but also from the battery which is not in use. With this method, it is possible to prevent conditions such as erased data, because the power supply to the computer is not interrupted even when replacing the battery. However, because wasteful electric power is always consumed from the battery not in use as a power source, the life of the battery which is not used as a power source is reduced.

SUMMARY OF THE INVENTION

Accordingly, an object of the present invention is to provide a small electronic device wherein stable operations can be carried out at all times even when the battery being used as a power source is to be removed, and yet wherein it is possible to reduce the power consumption of the battery which is not used as a power source.

To achieve this object, the present invention provides a small electronic device which comprises: a main body having a plurality of mounting portions; a plurality of batteries detachably mounted on the plurality of mounting portions; a plurality of locking means for releasably locking batteries on their corresponding mounting portions; first detecting means for detecting a release of locked conditions of each of the locking means; a plurality of first switches for connecting the plurality of batteries to a power supply node; and a switch control means for controlling the plurality of first switches so that one of batteries is connected to the power supply node, and for switching from an OFF state to an ON state the first switch corresponding to one of the other batteries when the first detecting means detects that the locking means corresponding to the battery connected to the power supply node is released.

In this small electronic device, when the locked condition of the battery connected to the power supply node is released, the first switch corresponding to one of the batteries not connected to power supply node will be set to the ON state. Therefore, when the operator releases the locked condition of the lock means in order to remove the battery used as the power source from the main body of the computer, two batteries will be connected to the power supply node immediately upon the release of the locking means. The battery cannot be removed from the main body unless the locking means thereof has been released; therefore, in this small electronic device, when the battery used as the power source is removed by the operator, power is already supplied to the small electronic device by another battery. Therefore, the supply of the power will not be discontinued and the reliability of operation can be improved. Further, it is during a very short period that both batteries are used as the power source from a time the locked state of the battery in use is released to a time the battery is removed from the main body. For this reason, it will also be possible to reduce the power consumption of the battery which is not used as the power source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

A lap top type personal computer according to an embodiment of the present invention will now be described.

Figure 1:
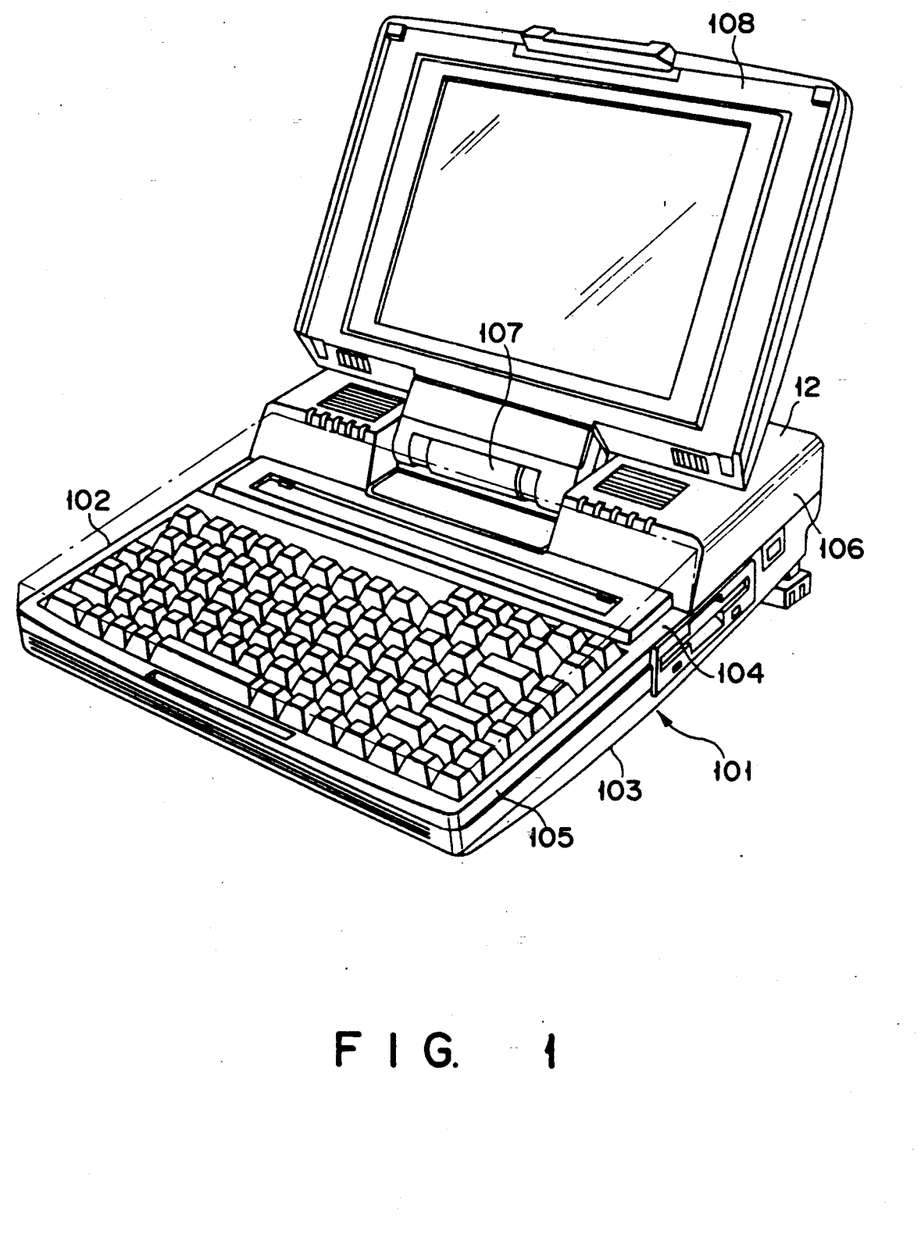
FIG. 1 is a perspective diagram of the appearance showing the overall structure of a lap top type personal computer according to an embodiment of the present invention.
Figure 2:
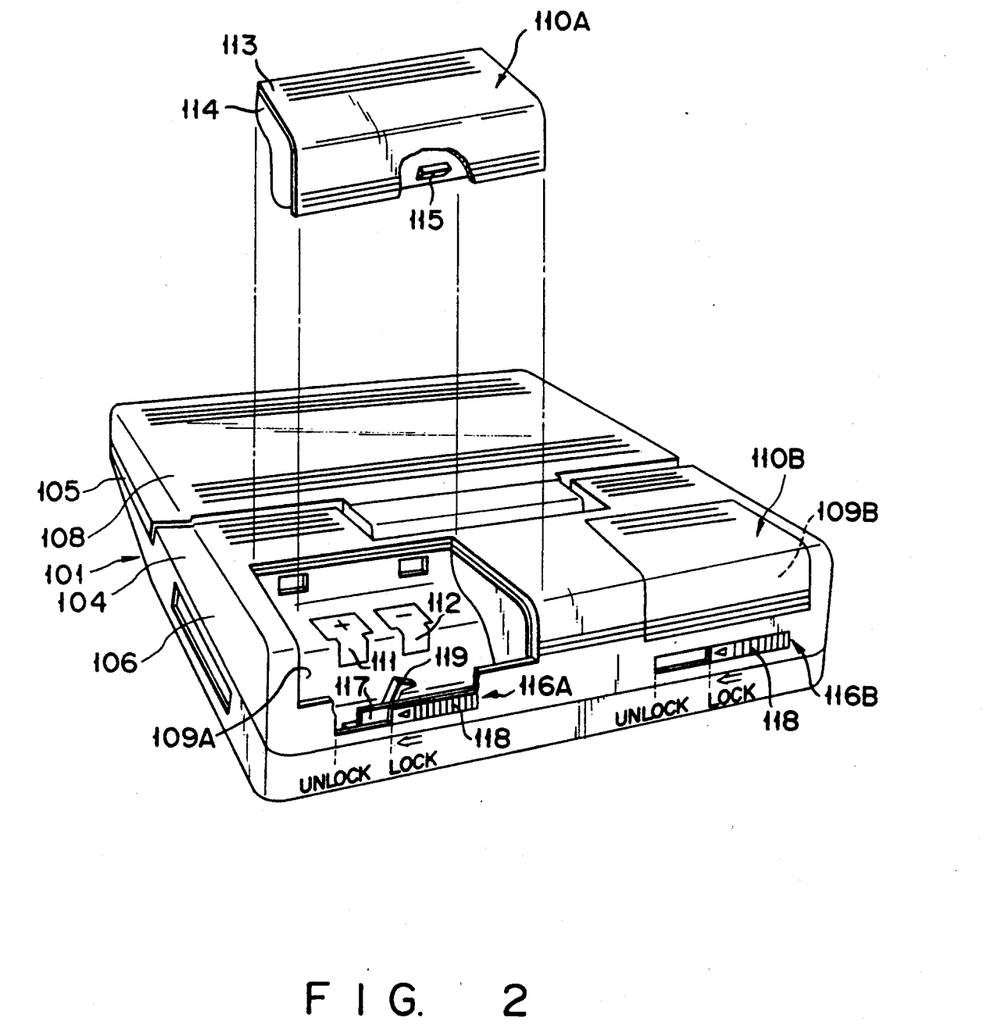
FIG. 2 is a perspective diagram of the appearance of the rear side of the personal computer, from which the battery pack is removed.

As shown in FIGS. 1 and 2, the lap top computer of the invention comprises an almost flat box-like main body 101. This main body 101 has a front section which is formed thinner than the rear section thereof, and a keyboard housing 102 is integrally installed on the front section. The main body 101 is composed by combining a bottom case 103 and a top cover 104. The top cover 104 consists of a front top cover 105 which from the frame of the keyboard housing 102, and a rear top cover 106.

At the center of the front end of the rear top cover 106 is provided a hinge 107, whereby a flat panel type plasma display housing 108 is installed freely and rotatably. When this lap top type personal computer is not in use or not carried, the whole apparatus can be folded into an easy-to-carry box form by rotating the plasma display housing 108 to the position indicated by the alternate long and short dash lines shown in FIG. 1.

As shown in FIG. 2, at the rear of the rear top cover 106 are formed, on the right and left sides thereof, a pair of battery mounting portions 109A, 109B. Each of these mounting portions 109A, 109B is formed by a concave section opened to the top and the rear of the rear top cover 106. On each of the mounting portions 109A, 109B is detachably mounted a battery pack 110A, 110B. On each of the mounting portions 109A, 109B is provided a positive (+) electrode 111 and a negative (−) electrode 112 which are to be in electrical contact with each of the mounted battery pack.

The battery pack 110A consists of an external cover 113 and a case 114 which has a form corresponding to the mounting portion 109A. Inside the case 114 are contained a plurality of, for example eight, rechargeable dry cells. On the back side of the case 114 is formed an engagement lug 115. The battery pack 110A, when mounted on the mounting portion 109A, is fixed to the mounting portion 109A by a locking device 116A, having a slidable structure and formed on the back of the rear top cover 106.

The locking device 116A consists of a slider 117 provided to freely slide between the locking position and the unlocking position along a guide not shown in the diagram, an operating element 118 for moving the slider 117 from the locking position to the unlocking position, and an engagement claw 119 which is integrally formed with the slider 117. The engagement claw 119 engages with the engagement lug 115 of the battery pack 110A when the slider 117 is set at the locking position and fixes the battery pack 110A to the mounting portion 109A. The slider 117 is always positioned at the locking position by an elastic force applied in a direction from the unlocking position to the locking position by means of a spring not shown in the diagram. When the operator slides the operating element 118 to move the slider 117 to the unlocking position, the engaged condition of the engagement claw 119 and the engagement lug 115 is released, such that it is possible to take out the battery pack 110A from the mounting portion 109A.

The battery pack 110B has the same structure as that of the battery pack 110A, and when the battery pack 110B is mounted on the mounting portion 109B, the battery pack 110B is fixed to the mounting portion 109B by the locking device 116B which has the same sliding structure as the locking device 116A. The locked condition of the locking device 116A is released by sliding the operating element 118.

Figure 3A:
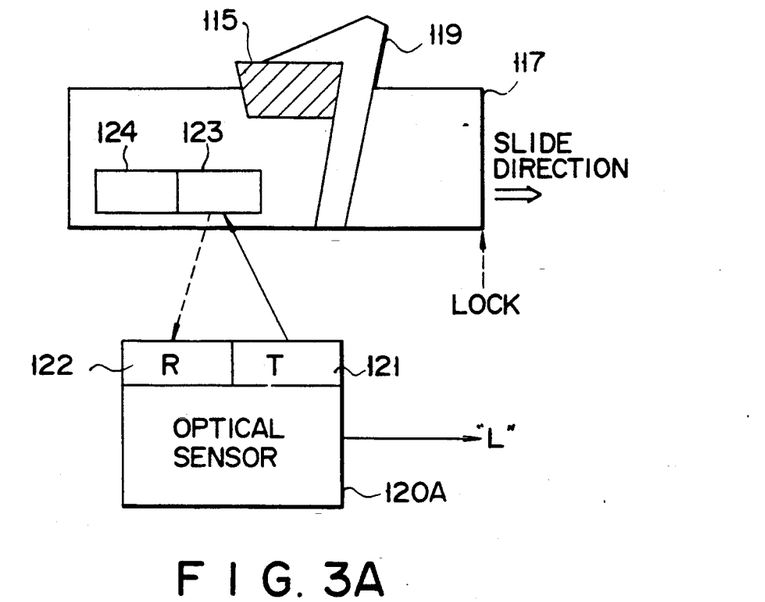
FIGS. 3A and 3B are diagrams to explain the principle for detecting the released of locked condition of the battery locking mechanism by an optical sensor provided in the computer shown in FIG. 2.
Figure 3B:
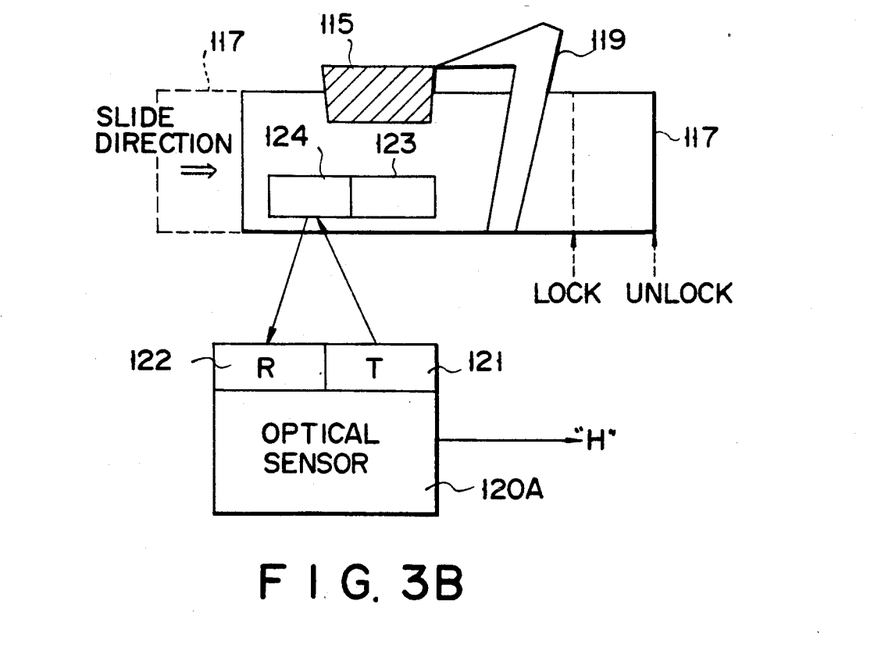

Furthermore, an optical sensor to be described in FIGS. 3A and 3B is buried and formed in each of the mounting portions 109A, 109B. The optical sensor formed on the mounting portion 109A detects the release of the locked condition of the battery pack 110A. The optical sensor formed on the mounting portion 109B detects the release of the locked condition of the battery pack 110B.

Now the principle of detection of the release of locked condition by these optical sensors will be explained by referring to FIGS. 3A and 3B.

The optical sensor 120A is a photoelectric switch which corresponds to the locking device 116A and is turned ON or OFF by reflected light. The optical sensor 120A consists of a light emitting section 121 comprising a photo diode and a light receiving section 122 comprising a photo transistor. On the back of the slider 117 of the locking device 116A are a light absorbing plate 123 and a light reflecting plate 124 provided side by side in the sliding direction.

As shown in FIG. 3A, when the slider 117 is positioned in the locked position, the light emitted from the light emitting section 121 travels to the light absorbing plate 123 and is absorbed by it. Therefore, when the slider 117 is positioned in the locked position, it cannot receive the light and the optical sensor 120A issues an electric signal of "L" level, which indicates that the locking device 116A is in a locked condition.

On the other hand, as shown in FIG. 3B, when the slider 117 is moved from the locked position to the unlocked position, the light emitted from the light emitting section 121 travels to the light reflecting plate 124, is reflected thereby, and received by the light receiving section 122. Therefore, when the slider 117 is moved to the unlocked position, the optical sensor 120A issues an electric signal of "H" level, which indicates that the locked condition of the locking device 116A has been released.

The releasing of the locked condition of the locking device 116B is also detected by the optical sensor 120b (not shown in FIGS. 3A, 3B) having the same structure as the optical sensor 120A.

Now, the overall system structure of the lap top type personal computer of the embodiment according to the present invention will be described with reference to FIG. 4.

The computer comprises a system bus 10, a CPU 11, a ROM 12, a RAM 13, a DMAC (Direct Memory Access Controller) 14, a PIC (Programmable Interrupt Controller) 15, a PIT (Programmable Interval Timer) 16, and an RTC (Real Time Clock) 17, all of which are respectively connected to the system bus 10.

The CPU 11 executes various data processings and controls overall operations of the computer system. In the ROM 12 is stored a fixed program necessary for the execution of various data processing operations of the CPU 11. In the RAM 13 will be stored programs and various data etc. to be processed. The RAM 13 has a memory capacity of 1.5M-bytes, 640K-bytes of which are used as the main memory, and the remaining 896K-bytes are used as what is called the hard RAM. In the memory area which is utilized as the hard RAM, power is always supplied by the backup power source (VBK) even when the main power switch of the computer is turned off.

The DMAC 14 directly controls the memory access. The PIC 15 controls interruptions according to the program set therein. The RTC 17 is a clock module having its own battery for operation thereof.

The system bus 10 is further connected with an extending RAM 18, a backup RAM 19, a hard disc controller (HDC) 20B, a floppy disc controller (FDC) 20F, a printer controller (PRT-CONT) 21, a Universal Asynchronous Receiver/Transmitter (UART) 22, a keyboard controller (KBC) 23, a display controller (DISP-CONT) 24, and a video RAM (VRAM) 25.

The extending RAM 18 consists of a memory card of 1M-byte or 2M-bytes and is mounted on the computer as occasion demands. The backup RAM 19 has a data save area to realize the resume function, and the backup power source (VBK) is always supplied to the backup RAM 19. The hard disc controller (HDC) 20B drives and controls the hard disc drive unit 20A under the control of the CPU 11, to perform read/write operation with respect to a 3.5 inch magnetic recording medium, and the floppy disc controller 20F drives and controls the floppy disc drive unit 32 or the external floppy disc drive unit 33 as occasion demands, under the control of the CPU 11.

The printer controller 21 is used to control the printer 34, the Universal Asynchronous Receiver/Transmitter 22 functions as an input/output interface, and the keyboard controller 23 is connected to the keyboard 36 to control the connected keyboard under the control of the CPU 11. The display controller 24 controls, also under the control of the CPU 11, the displaying operation of the plasma display (PDP; Plasma Display Panel) 37 or the CRT display (CRT) 38 externally connected to the computer. In the video RAM (VRAM) 25 is stored the display data to be displayed on the plasma display 37 or the CRT display 38 such that the display data can be prevented from being erased by the backup power source (VBK).

The power control interface (PS-IF) 28 is also connected to the system bus 10, and connects the power supply circuit 30 to the CPU 11 by means of the system bus 10. An AC adaptor 29 is a power source adaptor which rectifies and smoothes the commercial alternating current power source to thereby obtain a DC power source of a specified voltage, and is plugged into the main body of the computer.

The power supply circuit 30 comprises a power control CPU (PC-CPU) 306 and monitors, always under the control thereof, the conditions of the power supply inside the computer without regard to the on or off condition of the main power switch of the computer. The power supply circuit 30 is connected electrically with the battery pack (R-BATT) 110A, which is detachably mounted on the mounting portion 109A on the right side of the rear cover 106 of the computer described in FIG. 2, and the battery pack (L-BATT) 110B, which is detachably mounted on the mounting portion 109B on the left side thereof. In addition, the power supply circuit 30 is connected electrically with the optical sensor 120A for detecting the release of locked condition of the locking device 116A on the right side and the optical sensor 120B for detecting the release of locked condition of the locking device 116B on the left side. The power supply circuit 30 is composed so as to selectively use the two battery packs (R-BATT, L-BATT) 110A and 110B according to the detection signal from the optical sensors 120A and 120B, the details of which will be described in reference to FIG. 5.

The printer 34 is connected to the printer controller 21 as occasion demands. The RS-232C interface equipment 35 is connected to the UART 22 as may be required. The keyboard 36 is formed as an integral part of the main body of the personal computer. The plasma display (PDP) 37 is provided freely and rotatably in a range between the closed position and the released position with respect to the main body of the computer, and is connected to the display controller 24. The CRT display 38 is connected externally to the display controller 24 as required and an extending unit is selectively connected to the connector 40 for extension, as required.

Figure 5:
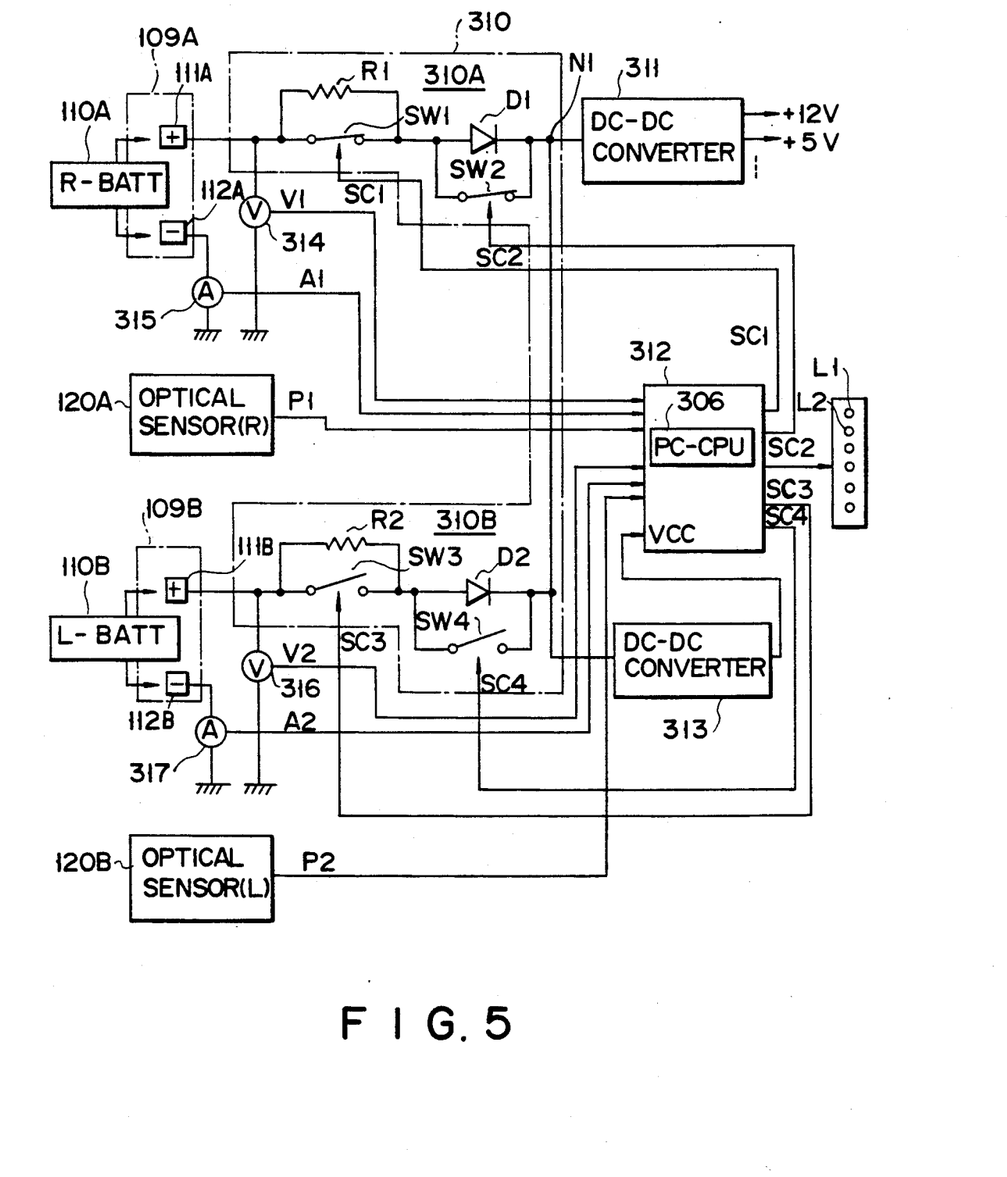
FIG. 5 is a circuit diagram showing one example of a specific structure of a power circuit provided in the computer.

Next, one example of a specific structure of the power supply circuit 30 will be explained by referring to FIG. 5.

The power circuit 30 comprises a switching circuit 310, a first DC-DC converter 311, a control unit 312, a second DC-DC converter 313, a first and second voltage detector 314, 316, and a first and second current detector 315, 317. The first DC-DC converter 311 generates a power supply voltage for driving each unit which constitutes the computer system shown in FIG. 4. The second DC-DC converter 313 generates a power supply voltage for regularly driving the power control CPU 306 of the control unit 312.

The switching circuit 310 selects the battery pack (R-BATT) 110A or the battery pack (L-BATT) 110B as computer's power source, and supplies power from the selected battery pack to the first DC-DC converter 311. The switching circuit 310 contains a switch section 310A for selecting the battery pack (R-BATT) 110A as its power source and a switch section 310B for selecting the battery pack (L-BATT) as its power source.

The switch section 310A consists of two switches SW1, SW2, a by-pass resistor R1, and a PN junction diode D1. One end of the switch SW1 is connected to the positive (+) electrode 111A of the battery mounting portion 109A on the right side, while the other end thereof is connected to the anode of the diode D1. The cathode of the diode D1 is connected to an input node N1 of the DC-DC converter 311, the by-pass resistor R1 is connected in parallel to the switch SW1, and the switch SW2 is connected in parallel to the diode D1. The switch SW1 is controlled so as to be turned on or off by means of the switch control signal SC1 supplied from the control unit 312. The switch SW2 is controlled so as to be turned on or off by means of the switch control signal SC2 supplied from the control unit 312.

In the case where the battery pack (R-BATT) is selected as a power source, the switches SW1 and SW2 of the switch section 310A are both set to their ON positions by the control unit 312, as shown in the diagram. In this case, the current flows from the battery pack (R-BATT) 110A to the DC-DC converter 311 by means of the switches SW1, SW2, thereby supplying the input supply voltage to the DC-DC converter 311. The DC-DC converter 311 converts the input supply voltage from the battery pack (R-BATT) into various power supply voltages (such as +12 V, +5 V), and supplies the converted voltage to the unit in the system shown in FIG. 4. On the other hand, in the case where the battery pack (R-BATT) 110A is not selected as a power source, the switches SW1 and SW2 are set to their OFF positions by the control unit 312. In this case, the diode D1 prevents the current from flowing reversely from the input node N1 of the DC-DC converter 311 to the battery pack (R-BATT) 110A.

The switch section 310B comprises two switches SW3 and SW4, a by-pass resistor R2, and a PN junction diode D2. One end of the switch SW3 is connected to the positive (+) electrode 111B of the battery mounting portion 109B on the left side, while the other end thereof is connected to the anode of the diode D2, the cathode of the diode D2 is connected to the input node N1 of the DC-DC converter 311, the by-pass resistor R2 is connected in parallel to the switch SW3, and the switch SW4 is connected in parallel to the diode D2. The switch SW3 is controlled so as to turn on or off by the switch control signal SC3 supplied from the control unit 312, and the switch SW4 is controlled so as to turn on or off by the switch control signal SC4 supplied from the control units 312.

In the case where the battery pack (L-BATT) 110B is selected as a power source, the switches SW3 and SW4 are both turned on by the control unit 312. In this case, the current is supplied to the DC-DC converter 311 from the battery pack (L-BATT) 110B by means of the switches SW3, SW4, whereby the input supply voltage is supplied to the DC-DC converter 311. The DC-DC converter 311 converts the input supply voltage from the battery pack (L-BATT) 110B into various power supply voltages (such as +12 V, +5 V), and supplies the converted voltages to the unit inside the system shown in FIG. 4. On the other hand, in the case where the battery pack (L-BATT) 110B is not selected, the switches SW3 and SW4 are both turned off, as shown in the diagram, by the control unit 312. In this case, the diode D2 prevents the current from flowing reversely to the battery pack (L-BATT) 110B from the input node N1 of the DC-DC converter 311.

The by-pass resistors R1, R2 are provided for supplying the power supply voltage to the power control CPU 306 of the control unit 312 even when the main power switch (not shown in the diagram) of the computer is turned off by the operator. In other words, in the case where the main power switch of the computer is turned off by the operator, all switches SW1 through SW4 are turned off to minimize the power consumption, but the second DC-DC converter 313 is supplied with an input supply voltage respectively from the battery pack (R-BATT) 110A, by means of the by-pass resistor R1 and the diode D1, or from the battery pack (L-BATT) 110B, by means of the bypass resistor R2 and the diode D2. As a result of this, the power control CPU 306 of the control unit 312 is guaranteed of its operation by the power supply voltage Vcc given by the second DC-DC converter 313 even while the main power switch of the computer is turned off. Therefore, the power control CPU 306 can hold information such as which of the battery packs (R-BATT, L-BATT) 110A, 110B is being used as the power source before the main power switch of the computer was turned off, so that in the case where the main power switch of the computer is turned on again, the power control CPU 306 can select again the battery pack which was used previously as the power source.

In such a manner, because the by-pass resistors R1, R2 are utilized only for guaranteeing the operation of the power control CPU 306 in the case wherein the main power switch of the computer is turned off, the resistance value of each of the by-pass resistors R1, R2 is set at relatively high levels in order to prevent the surplus current from flowing out from each of the battery packs (R-BATT, L-BATT) 110A, 110B.

The voltage detector 314 and the current detector 315 are provided to detect whether or not the battery pack 110A is mounted on the mounting portion 109A, the voltage detector 314 detects the voltage V1 of the positive (+) electrode 111A of the mounting portion 109A, and the current detector 315 detects the current A1 flowing into the negative (−) electrode 112A of the mounting portion 109A. The detected voltage V1 and the current A1 are supplied to the control unit 312. The power control CPU 306 of the control unit 312 judges that the battery pack 110A is mounted on the mounting portion 109A when the voltage V1 and the current A1 are above the respectively corresponding reference values and judges that the battery pack 110A is not mounted on the mounting portion 109A when the voltage V1 and the current A1 are under the respectively corresponding reference values. The power control CPU 306 also has a function to detect the remaining capacity of the battery of the battery pack 110A based on the voltage V1 and the current A1, and in the case where the remaining capacity of the battery is lower than the specified value, the pilot lamp L1 provided on the main body of the computer goes on to instruct the operator of the need for replacement of the battery pack 110A.

The voltage detector 316 and the current detector 317 are provided to detect whether or not the battery pack 110B is mounted on the mounting portion 109B, the voltage detector 316 detects the voltage V2 of the positive (+) electrode 111B of the mounting portion 109B and the current detector 317 detects the current A2 flowing into the negative (−) electrode 112B of the mounting portion 109B. The detected voltage V2 and the current A2 are supplied to the control unit 312. The power control CPU 306 of the control unit 312 judges that the battery pack 110B is mounted on the mounting portion 109B when the voltage V2 and the current A2 are above the respectively corresponding reference values and judges that the battery pack 110B is not mounted on the mounting portion 109B when the voltage V2 and the current A2 are lower than the respectively corresponding reference values. The power control CPU 306 has a function to detect the remaining capacity of the battery of the battery pack 110B based on the value of the voltage V2 and the current A2, and in the case where the remaining capacity of the battery is lower than the specified value, the pilot lamp L2 provided on the main body of the computer goes on to instruct the operator of the need for replacement of the battery pack 110B.

The control unit 312 comprises the power control CPU 306 and the interface equipment between the power control CPU 306 and the aforementioned signals SC1 through SC4, V1, V2, A1, A2. The control unit 312, by controlling the switching circuit 310, executes the processing to select one of the battery packs (R-BATT, L-BATT) 110A, 110B as the power source and the processing to switch the battery to be used as the power source from the battery pack (R-BATT) 110A to the battery pack (L-BATT) or from the battery pack (L-BATT) to the battery pack (R-BATT) 110A. This switching process is executed based on the detection signal P1 from the optical sensor 120A, the detection signal P2 from the optical sensor 120B, voltages V1, V2, and currents A1, A2.

Figure 6:
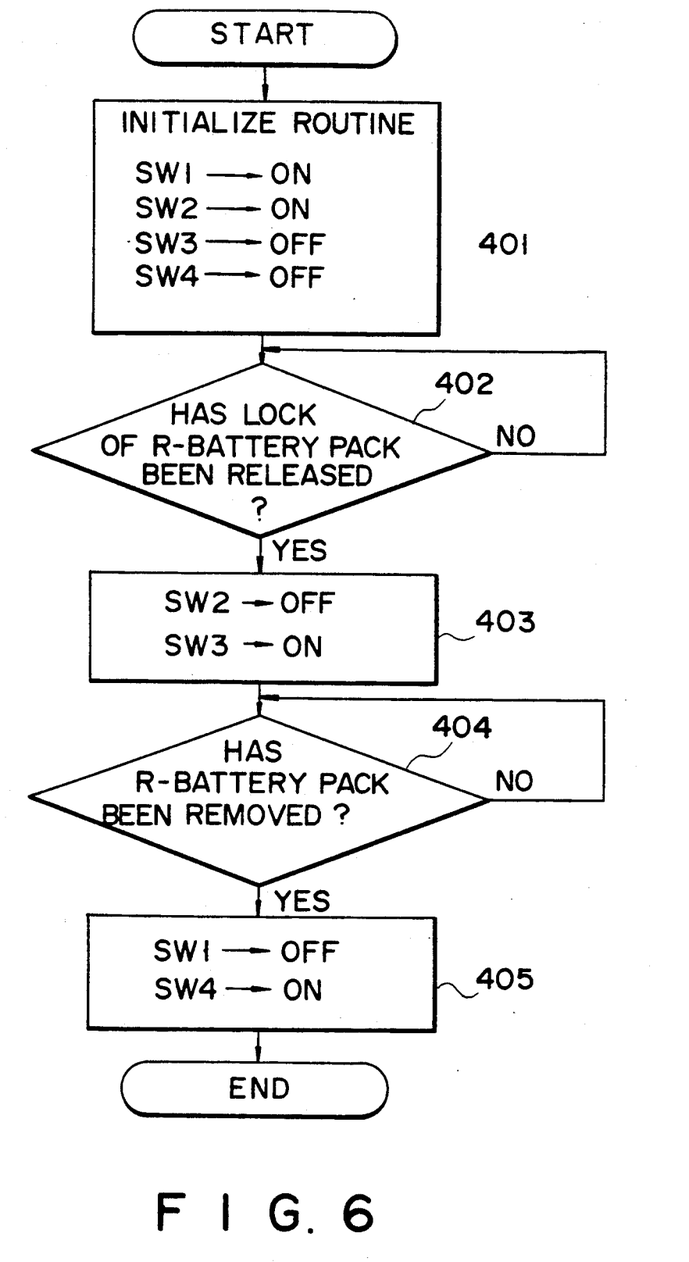
FIG. 6 is a flowchart for explaining the batter switching operation to be carried out by the power circuit.
Figure 7:
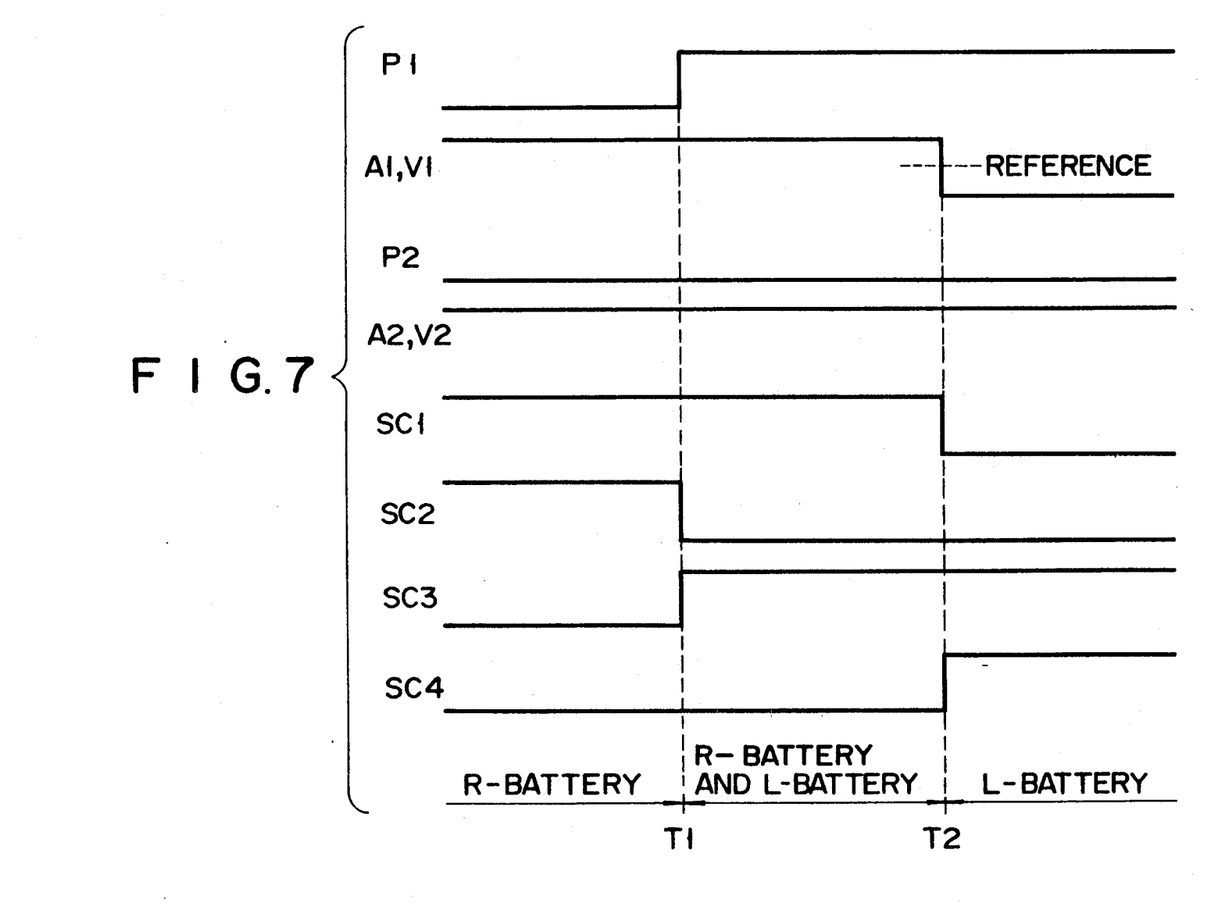
FIG. 7 is a timing chart for explaining the battery switching operation to be carried out by the power circuit.

Next, the switching process of the battery to be executed by the control unit 312 will be explained in detail by referring to the flowchart in FIG. 6 and the timing chart in FIG. 7.

In a condition where the battery pack (R-BATT) 110A and the battery pack (L-BATT) 110B are respectively mounted on the right side mounting portion 109A and the left side mounting portion 109B, as described in FIG. 2, the battery pack (R-BATT) 110A is fixed to the mounting portion 109A by the locking device 116A, and the battery pack (L-BATT) is fixed to the mounting portion 109B by the locking device 116B. In such a case, the voltage V1 detected by the voltage detector 314, the current A1 detected by the current detector 315, the voltage V2 detected by the voltage detector 316 and the current A2 detected by the current detector 317 are all above their respectively corresponding reference values. The optical sensors 120A and 120B respectively generate the detection signals P1, P2 of "L" level which indicate that the locking devices 116A, 116B are respectively in locked conditions.

When the main power switch of the computer is turned on by the operator under such conditions, the control unit 312 controls the switching circuit 310 such that one of the battery pack (R-BATT) 110A and the battery pack (L-BATT) 110B, for example the battery pack (R-BATT) 110A, can be used as the power source. In other words, the control unit 312 generates the switch control signals SC1 and SC2 of "H" level to turn on both the switches SW1 and SW2 of the switch section 310A, and generates the switch control signals SC3 and SC4 respectively of "L" level to turn off both the switches SW3 and SW4 of the switch section 310B (Step 401).

Figure 4:
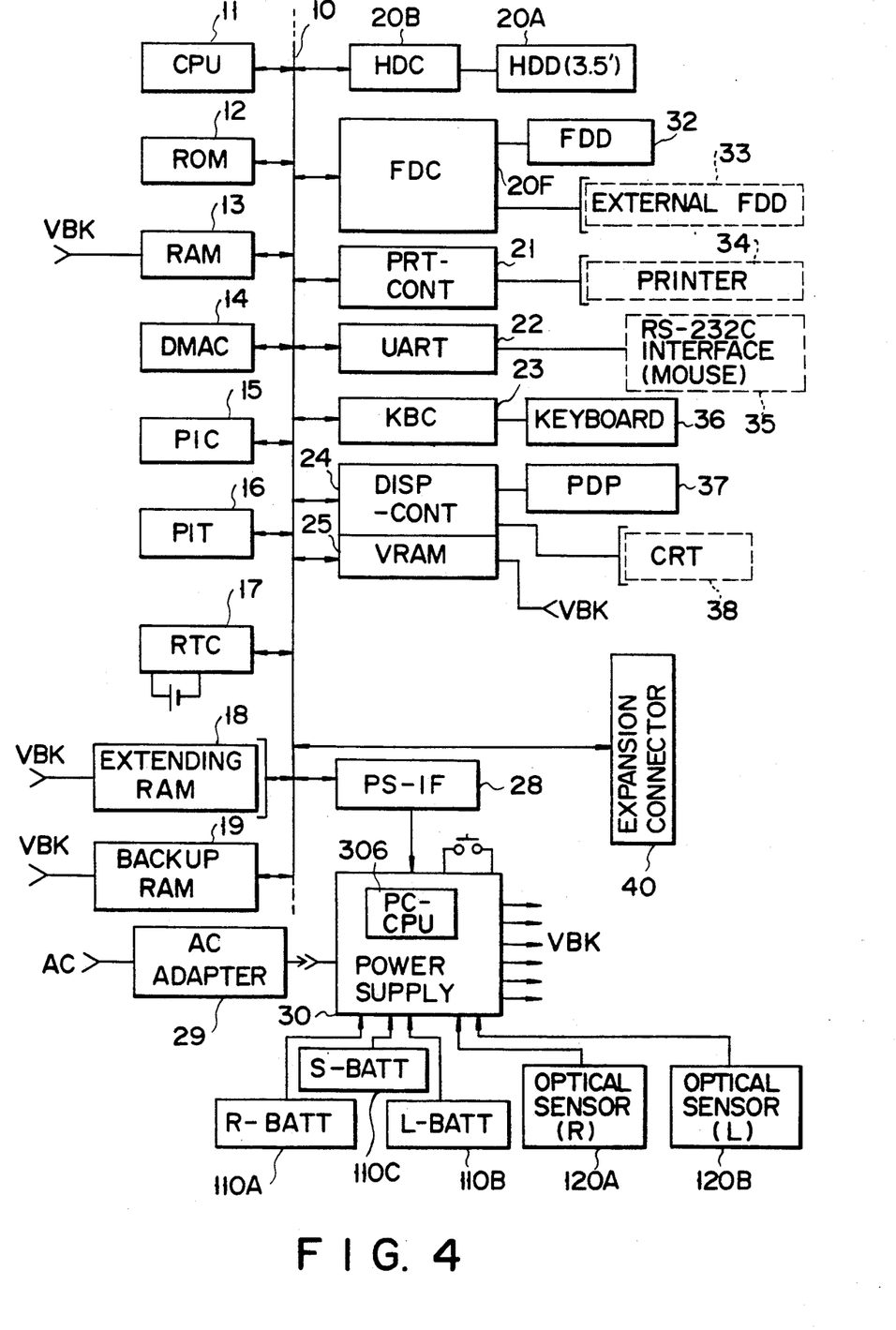
FIG. 4 is a schematic block circuit diagram showing the overall structure of the computer.

In this case, the DC-DC converter 311 converts the input power supplied from the battery pack (R-BATT) 110A into the specified power supply voltage (such as 12 V and 5 V) and supplies the converted power supply voltage to the units shown in FIG. 4. As a result of this, the computer is operated by using the battery pack (R-BATT) 110A as its power source.

When the computer is operated for a certain time by using the battery pack (R-BATT) 110A as its power source, the electric power of the battery pack (R-BATT) 110A is consumed, and the capacity of the battery will be gradually reduced. The control unit 312 calculates the remaining capacity of the battery of the battery pack (R-BATT) 110A based on the voltage V1 and the current A1 of the battery pack (R-BATT) 110A respectively detected by the voltage detector 314 and the current detector 315, and when the remaining capacity of the battery is lower than a specified value, the pilot lamp L1 goes on to inform the operator that the remaining capacity of the battery pack (R-BATT) 110A is insufficient.

When the operator notices the lighting of the pilot lamp L1, the operator removes the battery pack (R-BATT) 110A from the mounting portion 109A to replace or to charge the dry cells in the battery pack (R-BATT) 110A. When removing, the operator first moves the operating element 118 of the locking device 116A in order to release the locked condition of the locking device 116A of the battery pack (R-BATT) 110A. As the operating element 118 moves, the slider 117 of the locking device 116A is slid from the locked position to the unlocked position and the engagement claw 119 of the locking device 116A and the engagement lug 115 of the battery pack (R-BATT) 110A are released, whereby the locking device 116A will be released. The change of the locked condition of the locking device 116A is detected by the optical sensor 120A, and the detection signal P1 of the optical sensor 120A changes from the "L" level to the "H" level.

After the detection signal P1 has been changed from the "L" level to the "H" level, the control unit 312 recognizes that the battery pack (R-BATT) 110A has been released by the locking device 116A (Step 402) and changes the switch control signal SC2 from the "H" level to the "L" level to change the switch SW2 from its on state to its off state and changes the switch control signal SC3 from the "L" level to the "H" level to thereby change the switch SW3 from its off state to its on state (Step 403).

Under such conditions, the input node N1 of the DC-DC converter 311 flows with the current from the battery pack (R-BATT) 110A by means of the switch SW1, which is in its on state, and the diode D1 also flows with the current from the battery pack (L-BATT) 110B by means of the switch SW3, which is in its on state, and the diode D2. That is, under the conditions such as the above, both the battery pack (R-BATT) 110A and the battery pack (L-BATT) 110B are selected as the power source. The diode D1 prevents the current flowing reversely from the battery pack (L-BATT) 110B to the battery pack (R-BATT) 110A. By preventing reverse current flow of the diode D1, the current will not flow from the battery pack (L-BATT) 110B to the battery pack (R-BATT) 110A even when the electric potential of the positive (+) electrode 111 corresponding to the battery pack (R-BATT) 110A is considerably lower than the electric potential of the positive (+) electrode 111 corresponding to the battery pack (L-BATT) 110B, such that the current can be efficiently supplied from the battery pack (L-BATT) 110B to the DC-DC converter 311.

When the operator actually removes the battery pack (R-BATT) 110A from the mounting portion 109A, the voltage V1 and the current A1 of the battery pack (R-BATT) 110A respectively detected by the voltage detector 314 and the current detector 315 are lower than the respectively corresponding reference values, such that the fact that the battery pack (R-BATT) 110A has been removed from the mounting portion 109A will be recognized by the control unit 312 (Step 404).

The control unit 312 which has recognized that the battery pack (R-BATT) 110A has been removed from the mounting portion 109A, causes the switch control signal SC1 to change from the "H" level to the "L" level, thereby changing the switch SW1 from its on state to its off state, and causes the switch control signal SC4 to change from the "L" level to the "H" level, thereby changing the switch SW4 from its off state to its on state (Step 405).

Under such conditions as the above, the input node N1 of the DC-DC converter 311 flows with the current from the battery pack (L-BATT) 110B by means of the switches SW3 and SW4 which are in their on state. By such operations, the computer operates on the battery pack (L-BATT) 110B as its power source.

Then, when the replacement or charging of the dry cells of the battery pack (R-BATT) 110A is completed, the operator mounts the battery pack (R-BATT) 110A on the mounting portion 109A again. Upon mounting, because the switch SW1 of the switching circuit 310 is set in its off state, even when the battery pack (R-BATT) 110A is mounted on the mounting portion 109A, wasteful current will not flow out from the battery pack (R-BATT) 110A, and the computer continues operating with the battery pack (L-BATT) 110B as the power source thereof.

As stated above, in the example of the embodiment of the present invention, when the locked condition of the battery pack (R-BATT) 110A used as the power source is released, that is, before the battery pack (R-BATT) 110A being used as the power source is removed from the mounting portion 109A, the switch SW3 corresponding to the battery pack (L-BATT) 110B, not being used as the power source, will be set in its on state. As a result of this, when the operator releases the locking device 116A to remove the battery pack (R-BATT) 110A from the mounting portion 109A, the two batteries of the battery pack (R-BATT) 110A and the battery pack (L-BATT) 110B will be used as the power source upon such releasing. As a result of this, in this computer, when the battery used as the power source is removed by the operator, the power source from another battery is already supplied. Therefore, when switching the battery to be used as the power source, the supply of the power source to the computer will not be discontinued, thereby improving the reliability of the operation thereof.

Further, the time that both of the two batteries of the battery pack (R-BATT) 110A and the battery pack (L-BATT) 110B are used as the power source is only a short period from the locked condition of the batter in use as the power source to when the battery is removed from the mounting portion. Therefore, the power consumed by the battery not in use will not be increased.

In the embodiment described above, the case where the two battery packs (R-BATT, L-BATT) 110A, 110B are used alternatively, but the principle of the present invention that the another battery is rendered active when the locking device corresponding to the battery being used as the power source is released, can also be applied in the same manner to the case of the computer where three or four battery packs are alternatively used.

In the above case, the released locking device is detected by the optical sensor, but instead of using the optical sensor, it is possible to use a microswitch and the like for mechanically detecting the releasing of the locking device. Furthermore, it is possible to mechanically detect the mounting of the battery pack by using the microswitch and the like rather than by using the voltage detector and the current detector as in the case of the aforementioned embodiment.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. An electronic device comprising:
   a main body having a plurality of mounting portions;
   a plurality of batteries respectively detachably mounted on said plurality of mounting portions;
   a plurality of locking means for locking said batteries on their corresponding mounting portions;
   a plurality of releasing means for releasing said plurality of locking means while said batteries are mounted on said mounting portions;
   first detecting means for detecting whether each of said locking means has been released by its corresponding releasing means;
   a switching circuit, including a plurality of first switches, for connecting said plurality of batteries to a power supply node; and
   switch control means for controlling said plurality of first switches to that one of the batteries is connected to the power supply node, and for switching from an off state to an on state the first switch corresponding to one of the other batteries when the first detecting means detects that the locking means corresponding to the battery connected to the power supply node is released.

2. An electronic device according to claim 1, further comprising second detecting means for detecting that each of said batteries has been taken off its corresponding mounting portion.

3. An electronic device according to claim 2, wherein, when it is detected by said second detecting means that the battery connected to the power supply node has been taken off its corresponding mounting portion, said switch control means switches from an on state to an off state the first switch corresponding to the battery connected to the power supply node.

4. An electronic device according to claim 1, further comprising power supply voltage converting means, connected to the power supply node, for converting a voltage at the power supply node into a power supply voltage of a specified value.

5. An electronic device according to claim 4, wherein said switching circuit further comprises a plurality of reverse-flow preventing means, respectively connected between the first switches and said supply voltage converting means, for preventing the current from flowing from said supply voltages converting means to said batteries.

6. An electronic device according to claim 5, wherein said switching circuit further comprises a plurality of second switches which are respectively connected in parallel to said plurality of reverse-flow preventing means.

7. An electronic device according to claim 6, wherein, when it is detected by said first detecting means that the locking means corresponding to the battery connected to the power supply node is released, said switch control means switches to an off state the second switch which corresponds to the battery released by the releasing means.

8. An electronic device according to claim 6, further comprising second detecting means for detecting whether each of said batteries has been taken off its corresponding mounting portion.

9. An electronic device according to claim 8, wherein, when it is detected by said second detecting means that the battery connected to the power supply node has been taken off its corresponding mounting portion, the switch control means switches to an off state the first switch which corresponds to the battery taken off its corresponding mounting portion, and switches to an on state the second switch which corresponds to one of the other batteries.

10. An electronic device according to claim 1, wherein said first detecting means includes an optical sensor having a photo diode and a photo transistor.

11. An electronic device according to claim 2, wherein said second detecting means includes a voltage detecting means for detecting a voltage of an electrode of each of said mounting portions and a current detecting means for detecting a current of the electrode of each of the mounting portions.

12. An electronic device comprising:
a main body having first and second mounting portions;
first and second batteries respectively detachably mounted on said first and second mounting portions;
first and second locking means for locking said first and second batteries on their corresponding mounting portions;
first and second releasing means for releasing said first and second locking means while said first and second batteries are mounted on said mounting portions;
detecting means for detecting whether each of said locking means has been released by its corresponding releasing means; and
a switching means for switching a power source for said electronic device from one of said first and second batteries to the other battery, when the detecting means detects that the locking means corresponding to said one of said first and second batteries has been released.

13. A method of switching a battery to be used as a power source of a small electronic device having a plurality of batteries respectively detachably mounted on a corresponding plurality of mounting portions, a plurality of locking members for locking the batteries on the corresponding mounting portions, and a plurality of releasing members for releasing respective ones of the plurality of batteries, comprising the steps of:
selecting one of the plurality of batteries which are respectively detachably mounted on and releasably locked by the plurality of locking members on the plurality of corresponding mounting portions of the small electronic device, and connecting the mounting portion corresponding to the selected battery to a power supply node;
detecting that the respective locking member of the selected battery has been released by its corresponding releasing member while the battery is mounted on said corresponding mounting portion; and
connecting the mounting portion corresponding to one of the non-selected batteries to the power supply node.

14. The method according to claim 13, further comprising the steps of:
detecting that the selected battery has been taken off its corresponding mounting portion, and
disconnecting the mounting portion corresponding to the selected battery from the power supply node.

15. A portable computer comprising:
a first battery storing portion having a first terminal;
a second battery storing portion having a second terminal;
a first battery removably stored in the first battery storing portion, the first battery having a third terminal connecting to the first terminal when the first battery is stored in the first battery storing portion;
a second battery removably stored in the second battery storing portion, the second battery having a fourth terminal connecting to the second terminal when the second battery is stored in the second battery storing portion;
a voltage converter for converting a battery voltage of one of the first and second batteries into a specified voltage;
a first line for connecting or disconnecting the first terminal and the voltage converter;
a second line for connecting or disconnecting the second terminal and the voltage converter;
a first latch for locking the first battery in the first battery storing portion;
a second latch for locking the second battery in the second battery storing portion;
a first release member for releasing the first latch;
a second release member for releasing the second latch;
a first detector for detecting that the first latch has been released by the first release member;
a second detector for detecting that the second latch has been released by the second release member;
a third detector for detecting that the third terminal of the first battery is disconnected from the first terminal of the first battery storing portion;
a fourth detector for detecting that the fourth terminal of the second battery is disconnected from the second terminal of the second battery storing portion;
a connection controller for controlling an electrical connection of the first and second lines, the connection controller connecting one of the first and second lines when the first and second detectors detect that both the first and second batteries are respectively locked by the first and second latches, connecting both the first and second lines when the first or the second detector detects that the latch corresponding to the connected line is released by the respective release member, and disconnecting the line corresponding to the released latch when the third or the fourth detector detects that the terminal of the battery corresponding to the released latch is removed from the terminal of the battery storing portion corresponding to the removed battery.

16. A portable computer according to claim 15, wherein the first line has a first switch for electrically connecting or disconnecting the first terminal and the voltage converter, and the second line has a second switch for electrically connecting or disconnecting the second terminal and the voltage converter, the connection controller controlling the first and second switches.

17. A portable computer according to claim 16 wherein the first and second lines have an interconnecting portion for connecting the first line and the second line through the voltage converter, the first switch, and the second switch.

18. A portable computer according to claim 17, wherein the first line has a first diode for preventing a first current of the second battery from flowing to the first battery via the first switch and the interconnecting portion, and the second line has a second diode for preventing a second current of the first battery from flowing to the second battery via the second switch and the interconnecting portion.

19. A portable computer according to claim 18, wherein the first line has a first bypass line for bypassing the first diode between the first switch and the interconnecting portion, the second line has a second bypass line for bypassing the second diode between the second switch and the interconnecting portion, the first bypass line has a first bypass switch for connecting or disconnecting the first bypass line, the second bypass line has a second bypass switch for connecting or disconnecting the second bypass line, the connection controller turns on one bypass switch corresponding to one line electrically connecting its battery and the voltage converter and turns off the other bypass switch corresponding to the other line electrically disconnecting its battery and the voltage converter when the first and second detectors detect that both of the first and second batteries are respectively locked by the first and second latches, turns off the bypass switch corresponding to the connected bypass line when the first or the second detector detects that the latch corresponding to the connected line is released by the release member, and turns on the bypass switch corresponding to the connected line when the third or the fourth detector detects that the terminal of the battery corresponding to the released latch is removed from the terminal of the battery storing portion corresponding to the removed battery.

* * * * *